(12) United States Patent
Pearce

(10) Patent No.: US 9,074,462 B2
(45) Date of Patent: Jul. 7, 2015

(54) INTEGRATED FIBER OPTIC MONITORING SYSTEM FOR A WELLSITE AND METHOD OF USING SAME

(75) Inventor: Jeremiah Glen Pearce, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 14/003,670

(22) PCT Filed: Mar. 8, 2012

(86) PCT No.: PCT/US2012/028199
§ 371 (c)(1),
(2), (4) Date: Sep. 6, 2013

(87) PCT Pub. No.: WO2012/122336
PCT Pub. Date: Sep. 13, 2012

(65) Prior Publication Data
US 2013/0336612 A1    Dec. 19, 2013

Related U.S. Application Data

(60) Provisional application No. 61/450,942, filed on Mar. 9, 2011.

(51) Int. Cl.
*G02B 6/44* (2006.01)
*E21B 47/10* (2012.01)
*E21B 47/01* (2012.01)
*E21B 47/12* (2012.01)

(52) U.S. Cl.
CPC ............ *E21B 47/101* (2013.01); *G02B 6/4415* (2013.01); *E21B 47/011* (2013.01); *E21B 47/102* (2013.01); *E21B 47/123* (2013.01)

(58) Field of Classification Search
None
See application file for complete search history.

(56) References Cited

U.S. PATENT DOCUMENTS

| 4,191,448 | A | * | 3/1980 | Dean et al. ............... | 385/113 |
| 4,474,426 | A | * | 10/1984 | Yataki ..................... | 385/111 |
| 5,042,904 | A | * | 8/1991 | Story et al. ............... | 385/105 |
| 5,542,019 | A | * | 7/1996 | Pascher ................... | 385/105 |
| 5,905,834 | A | * | 5/1999 | Anderson et al. .......... | 385/111 |
| 6,268,911 | B1 |  | 7/2001 | Tubel et al. | |

(Continued)

FOREIGN PATENT DOCUMENTS

| GB | 2364380 | | 1/2002 |
| GB | 2368921 | A * | 5/2002 |

(Continued)

OTHER PUBLICATIONS

Omnisens Technical Paper; Fiber Optic Distributed Sensing, Brillouin Sensing Technique, Feb. 28, 2011, 1 Page.

(Continued)

*Primary Examiner* — Mike Stahl

(57) ABSTRACT

Integrated fiber optic monitoring techniques for a wellsite are provided. A fiber optic cable is provided with a tubular housing having a channel and a plurality of slots, a plurality of optical fibers may be floatingly positionable in the channel for measuring at least one first wellsite parameter and a plurality of optical fibers fixedly may be positionable in each of the slots for measuring at least one second wellsite parameter. The tubular housing is positionable into a wellbore adjacent a tubing therein. Pairs of the fixed and floating optical fibers may be spliced together to perform Stimulated Brillouin measurements.

15 Claims, 4 Drawing Sheets

(56) References Cited

U.S. PATENT DOCUMENTS

| | | |
|---|---|---|
| 6,281,489 B1 | 8/2001 | Tubel et al. |
| 6,588,266 B2 | 7/2003 | Tubel et al. |
| 6,787,758 B2 | 9/2004 | Tubel et al. |
| 6,854,327 B2 | 2/2005 | Rambow et al. |
| 7,040,390 B2 | 5/2006 | Tubel et al. |
| 7,154,289 B2 | 12/2006 | Zivanovic |
| 7,201,221 B2 | 4/2007 | Tubel et al. |
| 7,245,791 B2 | 7/2007 | Rambow et al. |
| 7,254,289 B2 | 8/2007 | Wait et al. |
| 7,284,903 B2 | 10/2007 | Hartog |
| 7,409,858 B2 | 8/2008 | Wicks, III |
| 7,668,411 B2 | 2/2010 | Davies et al. |
| 7,740,064 B2 | 6/2010 | McCoy et al. |
| 7,946,341 B2 | 5/2011 | Hartog et al. |
| 7,954,560 B2 | 6/2011 | Mathiszik et al. |
| 2002/0007945 A1 | 1/2002 | Neuroth et al. |
| 2004/0043501 A1 | 3/2004 | Means et al. |
| 2004/0258373 A1* | 12/2004 | Andreassen .................. 385/100 |
| 2005/0174887 A1 | 8/2005 | Nash et al. |
| 2007/0065077 A1* | 3/2007 | Childers et al. .................. 385/37 |
| 2007/0110355 A1 | 5/2007 | Jaaskelainen et al. |
| 2007/0125163 A1 | 6/2007 | Dria et al. |
| 2007/0165980 A1 | 7/2007 | Jenkins et al. |
| 2008/0053654 A1 | 3/2008 | Ullah et al. |
| 2008/0247718 A1 | 10/2008 | Dowd et al. |
| 2009/0116000 A1* | 5/2009 | Kiddy et al. .................. 356/73.1 |
| 2009/0188665 A1 | 7/2009 | Tubel et al. |
| 2010/0107754 A1 | 5/2010 | Hartog et al. |
| 2010/0207019 A1 | 8/2010 | Hartog et al. |
| 2010/0315630 A1 | 12/2010 | Ramos et al. |
| 2011/0044574 A1 | 2/2011 | Strong |
| 2011/0058778 A1* | 3/2011 | Herbst .................. 385/100 |
| 2011/0069302 A1 | 3/2011 | Hill et al. |
| 2011/0088462 A1 | 4/2011 | Samson et al. |
| 2011/0088910 A1 | 4/2011 | McCann et al. |
| 2011/0149688 A1 | 6/2011 | Hill et al. |
| 2011/0185815 A1 | 8/2011 | McCann |
| 2011/0216996 A1 | 9/2011 | Rogers |
| 2011/0280103 A1 | 11/2011 | Bostick |
| 2011/0292763 A1 | 12/2011 | Coates et al. |
| 2012/0017687 A1 | 1/2012 | Davis et al. |
| 2012/0018149 A1 | 1/2012 | Fidan et al. |
| 2012/0082422 A1* | 4/2012 | Sarchi et al. .................. 385/101 |
| 2014/0056553 A1* | 2/2014 | Villiger et al. .................. 385/12 |
| 2014/0056781 A1 | 2/2014 | Jaaskelainen et al. |

FOREIGN PATENT DOCUMENTS

| | | |
|---|---|---|
| JP | 2009-103495 A * | 5/2009 |
| WO | 20090158630 | 12/2009 |
| WO | 2010010318 | 1/2010 |
| WO | 2010034986 | 4/2010 |
| WO | 20100136764 | 12/2010 |
| WO | 20100136810 | 12/2010 |
| WO | 2011010110 | 1/2011 |
| WO | 2011039501 | 4/2011 |
| WO | 2011058312 | 5/2011 |
| WO | 2011058313 | 5/2011 |
| WO | 2011058314 | 5/2011 |
| WO | 2011058322 | 5/2011 |
| WO | 2011067554 | 6/2011 |
| WO | 2011076850 | 6/2011 |
| WO | 2011079107 | 6/2011 |
| WO | 20110141537 | 11/2011 |
| WO | 20110148128 | 12/2011 |

OTHER PUBLICATIONS

International Search Report, PCT/US 12/28199; Jun. 22, 2012.

Omnisens, DITEST STAR Series Fiber Optic Distributed Temperature & Strain monitoring system (REF: DT—DITESTSTAR—Eng—02); pp. 1-4 (no dates).

* cited by examiner

INTEGRATED FIBER OPTIC MONITORING SYSTEM FOR A WELLSITE AND METHOD OF USING SAME

PRIORITY CLAIM

The present application which is a 371 application of PCT/US2012/028199, filed Mar. 8, 2012, claims priority from U.S. Provisional Application 61/450,942, filed Mar. 9, 2011.

TECHNICAL FIELD OF THE INVENTION

The present invention relates generally to techniques for performing wellsite operations. More specifically, the present invention relates to techniques and hardware, such as fiber optics, for monitoring a wellsite.

BACKGROUND

In the production of hydrocarbons from subsurface reservoirs, oilfield tools are typically deployed from a surface location and into a wellbore to reach subsurface reservoirs. Once a wellbore is formed, casings may be cemented into place within the wellbore, and the wellbore completed to initiate production of fluids from the reservoir. Tubing (or pipes) may be positioned in the wellbore to transfer fluids from the reservoir to the surface.

During wellsite operations, devices are often positioned in the wellbore to monitor downhole conditions. In some cases, fiber optics may be positioned in the wellbore to monitor various conditions of the wellsite. Examples of fiber optics techniques are described in U.S. Pat. Nos. 7,409,858, 7,254,289, 7,245,791, and 6,854,327.

Despite the development of fiber optic techniques, there remains a need to provide advanced techniques for effectively monitoring wellsite conditions. It may be desirable to provide techniques that provide enhanced monitoring, preferably in three-dimensional space. It may be further desirable to provide techniques that provide orientation information during monitoring. The techniques may involve one or more of the following, among others: monitoring a variety of parameters, flexible operation, adaptability to a desired wellsite operation, protected configuration, enhanced measurement, etc. The present invention is directed to fulfilling these needs in the art.

SUMMARY OF THE INVENTION

In one embodiment, the invention relates to an integrated fiber optic cable for a wellsite having a tubing positionable in a wellbore extending into a subterranean formation. As used herein, an "integrated" fiber-optic cable is one that integrates more than one fiber-optic measurement capability, such as DAS, DTS, DPS, etc., into a single cable. The integrated fiber optic cable includes a tubular housing having an internal channel and a plurality of external slots or channels, a plurality of optical fibers floatingly disposed in the housing for measuring at least one first wellsite parameter, and at least one optical fiber fixedly supported on the housing for measuring at least one second wellsite parameter.

The tubular housing preferably has at least one flat surface positionable adjacent the tubing whereby an orientation of the tubular housing against the tubing is readily maintained. The tubular housing may have a triangular, square, or rectangular cross-section. At least one of the plurality of floating optical fibers may be coupled to a sensor for measuring the wellsite parameter. Pairs of the fixed optical fibers and the floating optical fibers may be selectively coupled whereby an optical loop is formed for transmitting therebetween. The fixed optical fibers may measure strain using one or more of Stimulated Brillouin scattering or Fiber Bragg Gratings, other interferometric techniques, and/or be used for distributed acoustic sensing (DAS) measurements). A gel may be used to fill the channel. The fixed optical fibers may be adhered into the plurality of slots. At least one first and second wellsite parameters may comprise pressure, temperature, acoustics, curvature, bend, and/or strain.

In another aspect, the invention may relate to an integrated fiber optic monitoring system for a wellsite having a tubing positionable in a wellbore extending into a subterranean formation. The integrated fiber optic monitoring system may include at least one sensor, at least one surface interrogation unit and an integrated fiber optic cable positionable about the tubing. The integrated fiber optic cable preferably but not necessarily includes a tubular housing having an internal channel and a plurality of external slots, a plurality of optical fibers floatingly positionable in the channel for measuring at least one first wellsite parameter, and a plurality of optical fibers fixedly positionable in each of the plurality of slots for measuring at least one second wellsite parameter.

The integrated fiber optic monitoring system may also have a plurality of splices for selectively splicing together pairs of the fixed optical fibers and the floating optical fibers, a reel for deploying the fiber optic cable into the wellbore, and/or at least one sensor coupled to at least one of the floating optical fibers.

In yet another aspect the invention may relate to a method of monitoring a wellsite. The method involves positioning an integrated fiber optic cable at the wellsite, measuring at least one wellsite parameter with the fixed optical fibers and the floating optical fibers, and transmitting the measured wellsite parameter to a surface interrogation unit.

The method may further involve splicing a plurality of the at least one integrated fiber optic cables together, forming an optical loop by selectively splicing pairs of the plurality of fixed optical fibers and the plurality of floating optical fibers, determining strain using Stimulated Brillouin techniques, determining a shape of the cable from the plurality of fixed optical fibers, and/or coupling a sensor to at least one of the plurality of fixed optical fibers.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are, therefore, not to be considered limiting of its scope, for the invention may admit to other equally effective embodiments. The figures are not necessarily to scale, and certain features and certain views of the figures may be shown exaggerated in scale or in schematic in the interest of clarity and conciseness.

DETAILED DESCRIPTION OF THE INVENTION

The description that follows includes exemplary apparatuses, methods, techniques, and instruction sequences that embody techniques of the present inventive subject matter. However, it is understood that the described embodiments may be practiced without these specific details.

Figure 1:
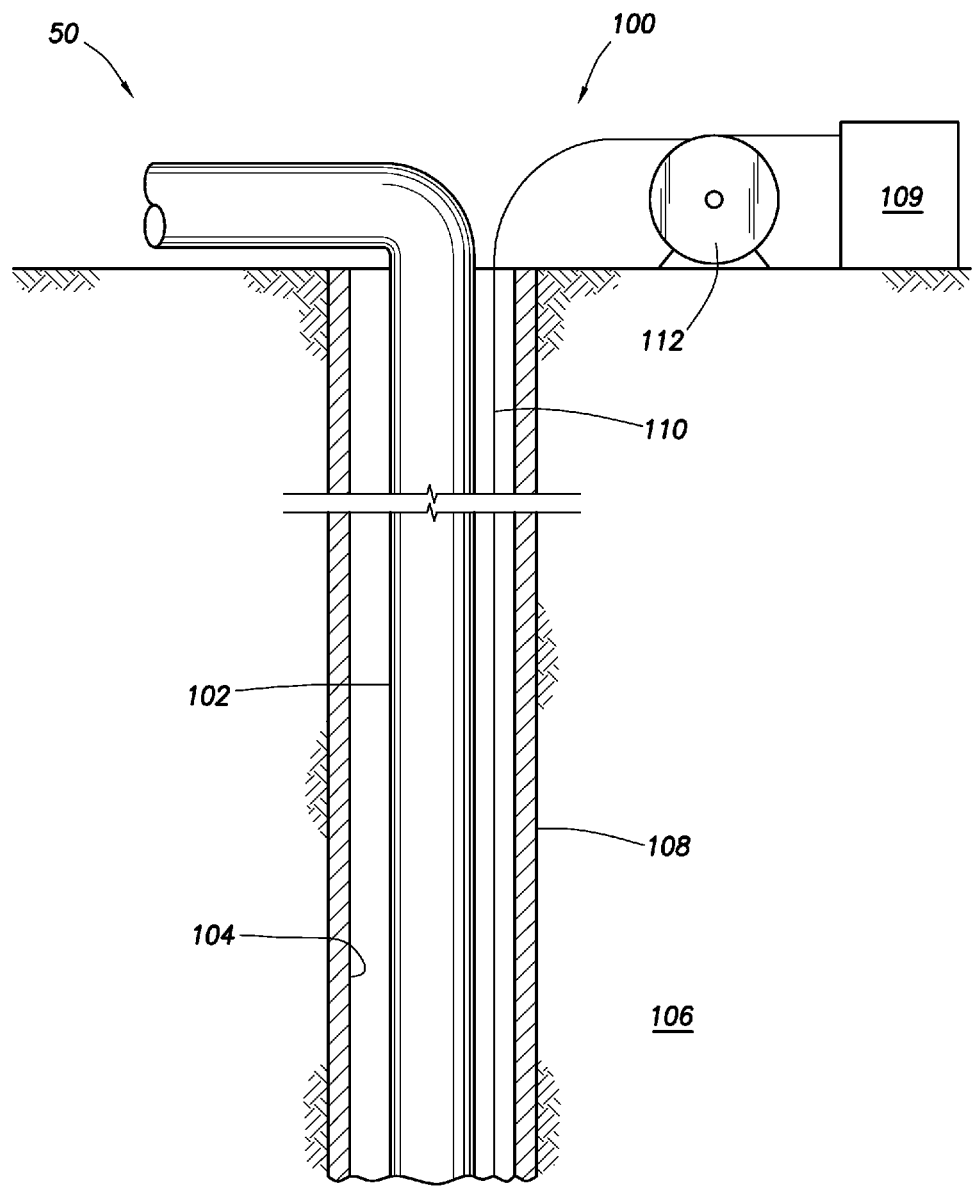
FIG. 1 is a schematic view, partially in cross-section of a wellsite having an integrated fiber optic monitoring system therein according to the invention.

FIG. 1 depicts a wellsite 50 with an integrated fiber optic monitoring system 100 therein. The wellsite 50 has a production tubing 102 extending into a wellbore 104 to reach a subsurface reservoir 106. The production tubing 102 may be positioned within a casing 108 lining the wellbore 104.

The integrated fiber optic monitoring system 100 includes an integrated fiber optic cable 110 deployed into the wellbore 104. As shown in FIG. 1, the integrated fiber optic cable 110 may be deployed into the wellbore 104 from a reel 112. As also shown in FIG. 1, the fiber optic cable 110 may be positioned between the production tubing 102 and the casing 108. In some applications, the fiber optic cable 110 may be helically positioned about the tubing. Where concentric tubings are provided, one or more fiber optic cables 110 may be positioned about one or more of the tubings and may be positioned on an inner or outer wall of the tubular, or in the annulus between concentric tubulars. The fiber optic cables 110 may be coupled to the tubing using, for example, cement, adhesives, connectors or the like.

Fiber optic monitoring system 100 may be positioned about various structures of the wellsite, such as the production tubing 102 of FIG. 1. Fiber optic monitoring system 100 may also be used with other production or non-production tubing (or tubulars), such as well casing, a non-perforated tubular, a perforated tubular, a drill pipe, a joint, a production tube, a casing tube, a tubular screen, a sand screen, a gravel pack screen, combinations thereof, and the like. The tubing can be formed from steel or other materials.

An interrogation (or data acquisition) unit 109 may be coupled to fiber optic monitoring system 100 to monitor a variety of wellsite parameters. The interrogation unit 109 may be used to receive signals (e.g., data) from the fiber optics cable 110. The interrogation unit 109 may be provided with communication, processing, interface, memory and/or other components for handling the data.

Fiber optic monitoring system 100 may be used during production and/or non-production wellsite operations, such as injection, depletion, completion, cementing, gravel packing, frac packing, production, stimulation, waterflood, a gas miscible process, inert gas injection, carbon dioxide flood, a water-alternating-gas process, liquefied petroleum gas drive, chemical flood, thermal recovery, cyclic steam injection, steam flood, fire flood, forward combustion, dry combustion, well testing, productivity test, potential test, tubing pressure, casing pressure, bottomhole pressure, downdraw, combinations thereof, and the like. Fiber optic monitoring system 100 may be configured to investigate downhole wellsite problems (e.g., those indicated by changes in production), such as crossflow, premature breakthrough, casing leaks, fluid migration, corrosion, tubing leaks, packer leaks, channeled cement, other problems with cement quality, blast joint leaks, thief zones, combinations thereof, and the like. Fiber optic monitoring system 100 may also be used to facilitate identification of the points or intervals of fluid entry/exit, the flow rate at such points, the type of fluid at such points, and the origin of the fluids coming into the well. Fiber optic monitoring system 100 may also be configured to investigate the integrity of a well as part of a routine maintenance operation.

Figure 2:
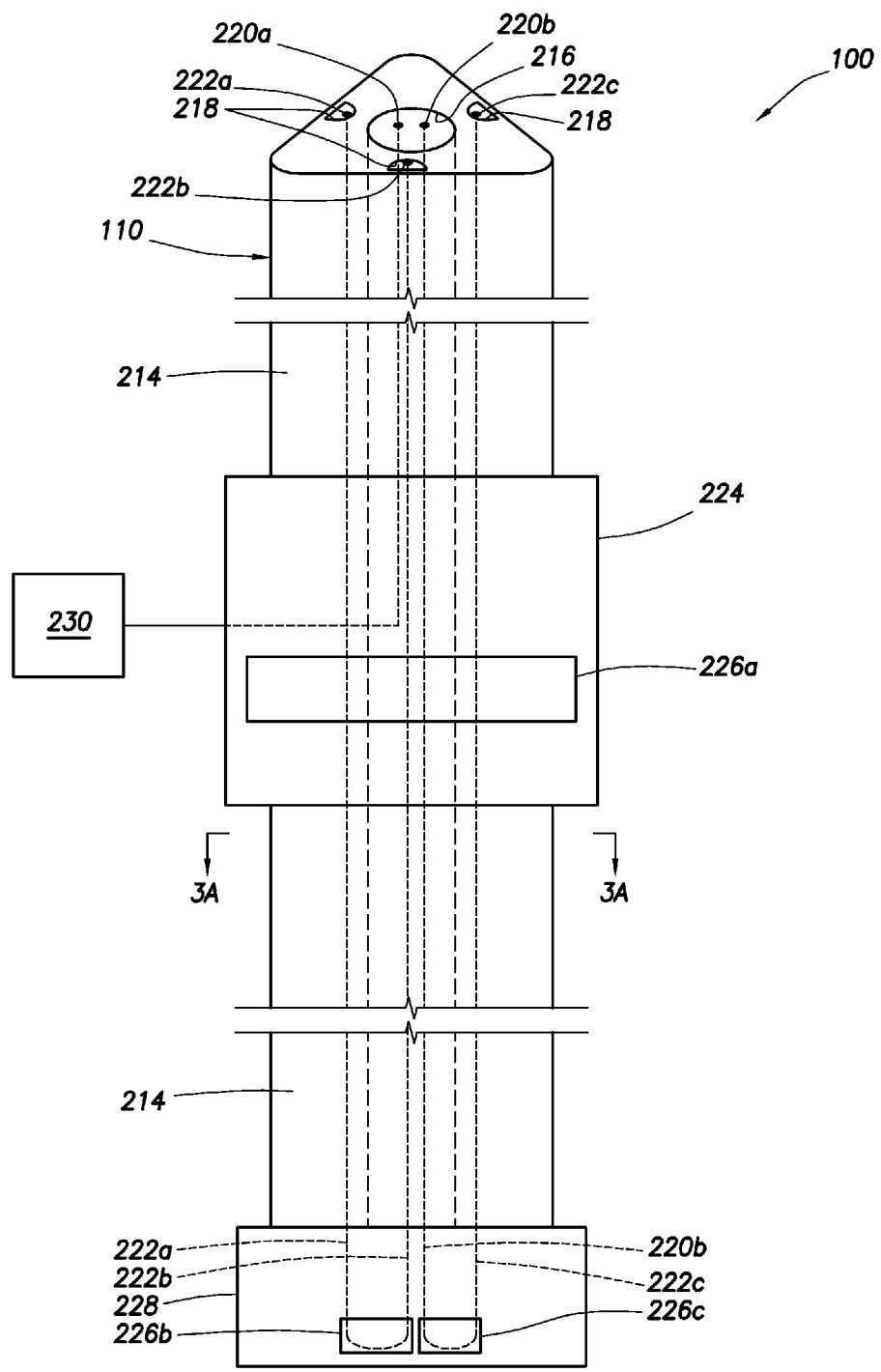
FIG. 2 is a schematic view of a portion of the integrated fiber optic monitoring system of FIG. 1 depicting an integrated fiber optic cable thereof.

FIG. 2 shows a schematic view of a portion the fiber optic monitoring system 100 of FIG. 1 in greater detail. As shown in this view, fiber optic cable 110 includes an elongated, tubular housing 214 having an internal longitudinal channel 216 and external longitudinal slots 218. Channel 216 and slots 218 of housing 214 provide passages for housing a plurality of optical fibers 220a-b, 222a-c. Housing 214 is preferably a sturdy material, such as metal (e.g., steel, INCONEL™, etc.), or other material capable of protecting the optical fibers in the wellbore.

Fiber optic cable 110 is preferably configured with multiple optical fibers run in parallel along the length of the cable to provide monitoring of various wellsite parameters. Fiber optic cable 110 preferably includes a plurality of both floating optical fibers (e.g., 220a-b) and fixed optical fibers (e.g., 222a-c) to measure a variety of wellsite parameters in a single cable (or fiber optic cables connected in series as shown in FIG. 2). In the illustrated embodiments, a plurality of floating optical fibers 220a-b are disposed in channel 216 and a plurality of fixed optical fibers 222a-c are each disposed in an external channel. The wellsite parameters that can be measured may include, for example, downhole parameters (e.g., temperature, pressure, acoustics, etc.) and various wellbore parameters (e.g., curvature, bend, strain (e.g., axial), etc.) along the wellbore.

While the floating fibers are disposed in the internal channel and the fixed fibers are each disposed in one of the external slots in the illustrated embodiment, it will be understood that other configurations are also suitable. By way of example only, there could be one internal channel housing the floating fibers and a second internal channel housing the fixed fibers, the floating fibers could be disposed in external channels or slots and the fixed fibers could be housed in an internal channel, or all fibers could be disposed in either a single channel or slot.

The optical fibers may be any fiber optic cable capable of transmitting data and/or communication signals through the wellbore. Examples of optical fibers and/or cables usable with the fiber optic monitoring system are available from OMNISENS™ SA located at 3 Riond Bosson, CH-1110 Morges, Geneva, Switzerland.

Still referring to FIG. 2, a preferred embodiment of fiber optic cable 110 has a plurality of floating optical fibers 220a, 220b positioned in channel 216, and a plurality of fixed optical fibers 222a, 222b, 222c positioned in slots 218. Optical fibers 220a-b, 222a-c preferably extend along the length of housing 214. A splice block 224 is provided between a series of housings 214. A splice 226a is provided for coupling optical fibers from one housing 214 to another. In this manner, a series of fiber optic cables 110 may be connected to extend through the length of the wellbore. Fiber optic cables 110 may be spliced together during installation or pre-assembled. Once fiber optic cables 110 are run into the well, the cable may be cut and spliced at the surface, for example for coupling to interrogation unit 109 as shown in FIG. 1.

Referring still to FIG. 2, a termination block 228 may also be provided at the end of the string of housings. Splices 226a-c are provided for optically coupling optic fibers for completing the communication link therebetween. As shown, fixed optical fibers 222a, 222b are paired together, and floating optical fiber 220b and fixed optical fiber 222c are paired together. Various pairings of fibers may be provided.

Floating optical fiber 220a is coupled to a sensor (or gauge) 230 for monitoring downhole parameters. Fiber optic monitoring system 100 may have one or more sensors 230 for monitoring downhole parameters, such as temperature, pressure, acoustics, etc. Sensor 230 may be any device capable of monitoring the desired downhole parameters, such as a pressure gauge, temperature gauge, gratings, strain gauge, piezoresistor, foil gauge, or other device positionable downhole.

Figure 3A:
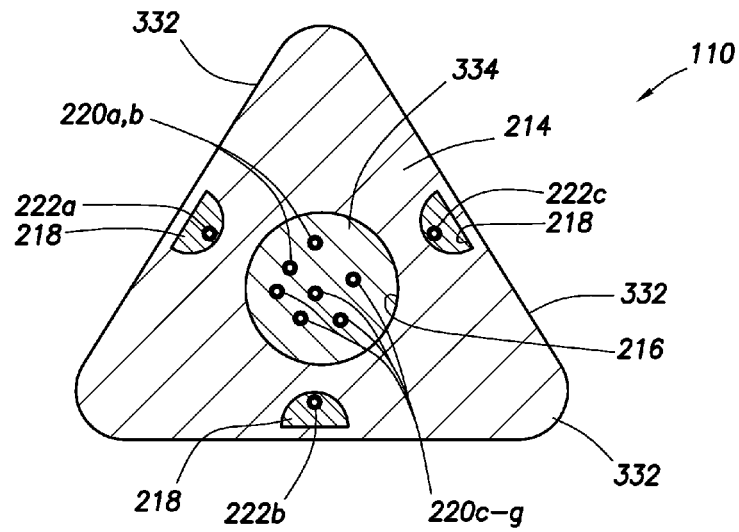
FIG. 3A is a cross-sectional view of the integrated fiber optic cable of FIG. 2 taken along line 3A-3A.
Figure 3B:
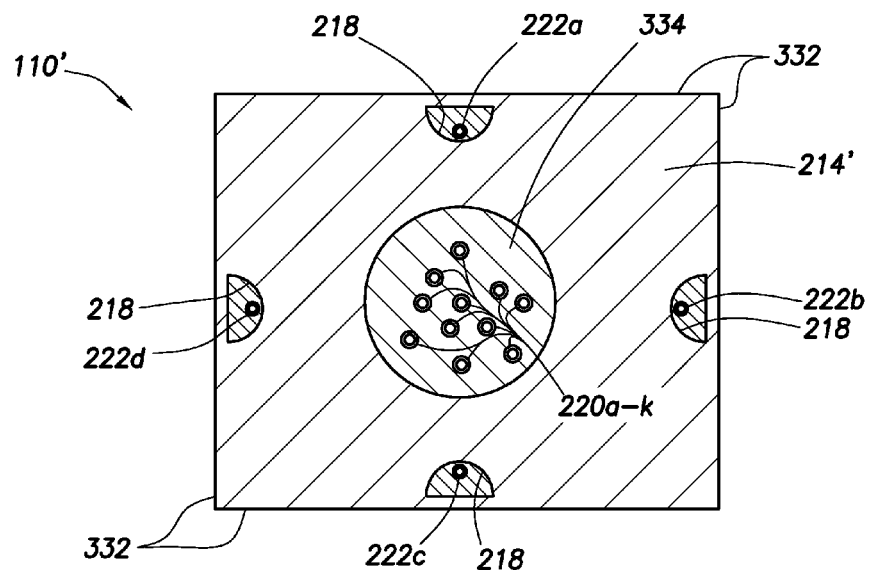
FIG. 3B is a cross-sectional view of an alternate integrated fiber optic cable.

FIG. 3A is a cross-sectional view of fiber optic cable 110 of FIG. 2 taken along line 3A-3A. As shown in this view, housing 214 has a triangular cross-section with a plurality of flat surfaces 332. Flat surfaces 332 may be used to facilitate positioning of fiber optic cable 110 against a tubing, and determining azimuthal orientation thereabout. Flat surfaces 332 preferably prevent rotation of fiber optic cable 110 to maintain a constant orientation about the tubing along the length of the wellbore. FIG. 3B shows an alternate fiber optic cable 110' having a housing 214' with a square shape. As demonstrated by FIGS. 3A and 3B, the housing may have various configurations, such as triangular, square or other shapes to maintain orientation of flat surfaces 332 against the tubing. A rectangular shape may permit greater thickness of the cable, and a larger cross-sectional area for hosting additional fibers.

One or more floating optical fibers (e.g., 220a-b) may be provided. Any number of optical fibers may be provided, such as optical fibers 220a-g as shown in FIG. 3A or optical fibers 220a-k of FIG. 3B. These floating optical fibers may be coupled to sensors or paired with other optical fibers as shown in FIG. 2.

In some embodiments, the optical fibers 220a-k may float within a gel 334 in channel 216. The gel 334 may be any material capable of supporting the optical fibers and/or facilitating monitoring (e.g., acoustic measurement) by the optical fibers. Gel 334 may be positioned in the housing to host floating optical fibers (e.g., 220a-g, 220a-k) for providing distributed measurements (e.g., a distributed temperature sensing (DTS) system, a distributed pressure sensing (DPS) system, a distributed acoustic sensing (DAS) system), communication lines, and/or fibers to splice in single point gauges (e.g., pressure, temperature gauges, gratings, strain gauges, piezoresistors, foil gauges, etc.).

Floating optical fibers 220a-k may be configured to operate as a DTS, DPS and/or DAS system. Floating optical fibers 220a-k are positioned within housing 214 to take measurements (e.g., temperature and pressure) along the length of casing 108 independently of the fixed optical fibers 222a-c. For example, internal pressure from fluid levels and wellhead annular pressure may be measured with a pressure gauge 230 that is positioned inside casing 108 (FIG. 1). Alternatively, other independent means of measuring or calculating temperature and pressure can be used.

Referring still to FIGS. 3A and 3B, fiber optic cable 110 may also be provided with one or more slots 218 having fixed optical fibers (e.g., 222a-c) disposed therein. As shown in FIG. 3A, three slots 218 with a corresponding fixed optical fiber 222a-c therein are provided. As shown in FIG. 3B, an alternate embodiment having four slots 218 with a corresponding fixed optical fiber 222a-d therein may be provided. Fixed optical fibers 222a-d may be adhered into positioned within slots 218 with a glue or other adhesive. Fixed optical fibers 222a-d may be rigidly attached to achieve good strain transfer/acoustic coupling. One or more slots 218 with a fixed optic fiber 222a-d therein may be used. Fixed optical fibers 222a-d may be used to measure various wellbore parameters, such as curvature, bend, strain (e.g., axial), etc.

When three or more slots 218 with fixed optical fibers 222a-c therein are positioned about fiber optic cable 110 to measure strain, the shape of fiber optic cable 110 may be derived using optical signals transmitted into fibers 222a-c. Fixed optical fibers 222a-c may be used to measure, for example, strain of the tubing at a range of depths throughout the wellbore. Where multiple fixed optical fibers are used to measure strain, a 3-D image may be obtained, depicting the shape of the cable and strain about the wellbore.

Various techniques may be used to measure various parameters determined from the optical fibers. For example, conventional distributed strain measurement techniques, such as Stimulated Brillouin scattering and Fiber Bragg Gratings (FBG) measurements may be used with this configuration, and the rigid attachment of the fiber to the cable should also enhance the acoustic response of a DAS measurement. While FBGs may be used in conjunction with wavelength division multiplexing (WDM) and/or frequency division multiplexing (FDM) for strain sensing, Stimulated Brillouin system such as manufactured by OMNISENS™ may also be used. Also, while FBGs with FDM may be used to achieve higher spatial resolutions and to detect the presence of localized events, Stimulated Brillouin systems may provide enhanced greater sensing lengths.

Various configurations of optical fibers may be used to enhance monitoring. Additional fixed optical fibers may be used to provide some redundancy. An even number of fixed optical fibers may be spliced together to form fiber loops for Stimulated Brillouin systems. The fixed optical fibers and the floating optical filled fiber may have different sensitivities to different types of acoustic modes and waves (shear versus compressional). The measurements taken by the various optical fibers may be compared and analyzed. If interrogated simultaneously, these modes may be decoupled and used for seismic profiling applications.

Referring to FIGS. 2, 3A and 3B, when using a Stimulated Brillouin system, a loop configuration (the ability to access both ends of the fiber with the instrument) may be needed. The number of fibers used in fiber optic cable 110 proposed in this invention may be minimized by splicing together pairs of the strain transfer fibers at the end of fiber optic cable 110, or by linking all fixed optical fibers 222a-c together by splicing at termination block 228. During deployment, fiber optic cable 110 may be shipped with the appropriate optical fibers spliced together at the end of fiber optic cable 110 by one or more splice blocks 224. Fiber optic cable 110 is then run like a standard control line on tubing (e.g., production tubing or outside of casing depending on the application). After fiber optic cable 110 is completely run in the well, it may be cut and spliced with the appropriate connectors at the well head.

Interrogation unit 109 may be positioned at the surface (on or off site) to measure parameters, such as temperature, strain, and acoustics. For the strain measurements, each fixed optical fiber or fiber pairs may be interrogated separately. An optical switch (not shown) may be used in order to minimize the number of interrogation units 109.

Figure 4:
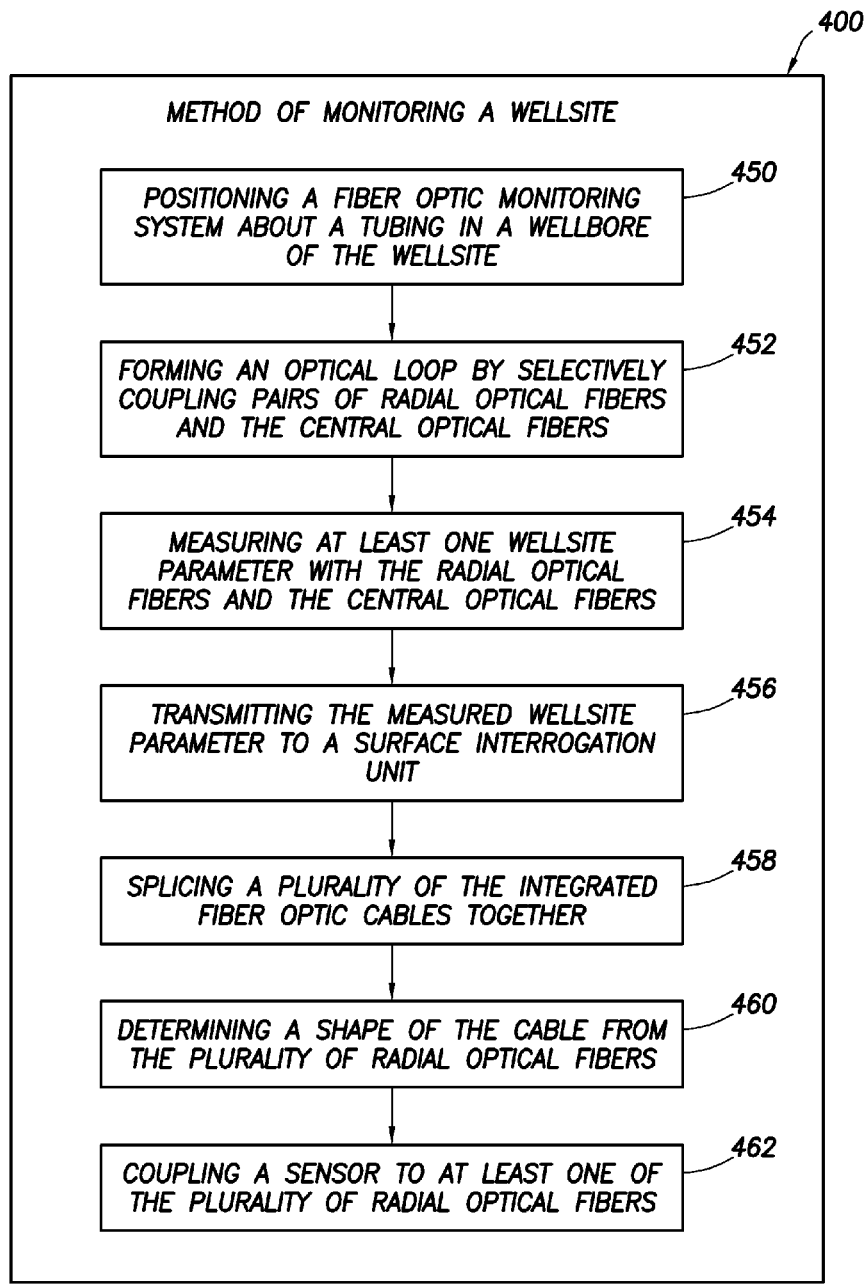
FIG. 4 is a flow chart of a method of monitoring.

FIG. 4 is a flow chart depicting a method (400) of monitoring a wellsite. The method involves positioning (450) a fiber optic monitoring system about a tubing in a wellbore of the wellsite, forming (452) an optical loop by selectively coupling pairs of the fixed optical fibers and the floating optical fibers, measuring (454) at least one wellsite parameter with the fixed optical fibers and the floating optical fibers, and transmitting (456) the measured wellsite parameter to a surface interrogation unit. The optical loop may be used for determining strain using Stimulated Brillouin techniques.

The method (400) may further involve additional steps, such as splicing (458) a plurality of the integrated fiber optic cables together, determining (460) a shape of the cable from the plurality of fixed optical fibers, and/or coupling (462) a sensor to at least one of the plurality of fixed optical fibers. The splicing may involve splicing pairs of the plurality of fixed optical fibers together and/or splicing at least one of the floating optical fibers with at least one of the fixed optical fibers.

It will be appreciated by those skilled in the art that the techniques disclosed herein can be implemented by programming using conventional computers, and/or for automated (autonomous) applications using software configured with algorithms to perform the desired functions. Aspects of the invention may also be configured to perform the described techniques using appropriate hardware or software and/or an extended communication (e.g., wireless, internet, satellite, etc.) network.

While the present disclosure describes specific aspects of the invention, numerous modifications and variations will become apparent to those skilled in the art after studying the disclosure, including use of equivalent functional and/or structural substitutes for elements described herein. For example, aspects of the invention may be provided with a various number of optical fibers (floating and/or radial). Further, while downhole applications of the fiber optic system are disclosed and described, it will be understood that the systems and methods described herein can also be used in surface applications. All such similar variations apparent to those skilled in the art are deemed to be within the scope of the invention as defined by the appended claims.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. An integrated fiber optic cable for a wellsite having a tubing positionable in a wellbore extending into a subterranean formation, the fiber optic cable comprising:
    a tubular housing having at least one of either an internal longitudinal channel or a plurality of external longitudinal slots, the tubular housing positionable into the wellbore adjacent the tubing;
    a plurality of floating optical fibers floatingly positionable in at least one of said channel or slots for measuring at least one first wellsite parameter; and
    a plurality of fixed optical fibers fixedly positionable in at least one of said channel or slots for measuring at least one second wellsite parameter, wherein said housing has an internal channel and external slots and wherein said floating fibers are disposed in said channel and said fixed fibers are disposed in said slots.

2. The integrated fiber optic cable of claim 1, wherein the tubular housing has at least one flat surface positionable adjacent the tubing whereby an orientation of the tubular housing against the tubing is maintained.

3. An integrated fiber optic cable for a wellsite having a tubing positionable in a wellbore extending into a subterranean formation, the fiber optic cable comprising:
    a tubular housing having at least one of either an internal longitudinal channel or a plurality of external longitudinal slots, the tubular housing positionable into the wellbore adjacent the tubing;
    a plurality of floating optical fibers floatingly positionable in at least one of said channel or slots for measuring at least one first wellsite parameter; and
    a plurality of fixed optical fibers fixedly positionable in at least one of said channel or slots for measuring at least one second wellsite parameter, wherein at least one of the plurality of floating optical fibers is coupled to a sensor for measuring the at least one wellsite parameter.

4. An integrated fiber optic cable for a wellsite having a tubing positionable in a wellbore extending into a subterranean formation, the fiber optic cable comprising:
    a tubular housing having at least one of either an internal longitudinal channel or a plurality of external longitudinal slots, the tubular housing positionable into the wellbore adjacent the tubing;
    a plurality of floating optical fibers floatingly positionable in at least one of said channel or slots for measuring at least one first wellsite parameter; and
    a plurality of fixed optical fibers fixedly positionable in at least one of said channel or slots for measuring at least one second wellsite parameter, wherein pairs of the plurality of fixed optical fibers and the plurality of floating optical fibers are selectively coupled whereby an optical loop is formed for transmitting therebetween.

5. An integrated fiber optic cable for a wellsite having a tubing positionable in a wellbore extending into a subterranean formation, the fiber optic cable comprising:
    a tubular housing having at least one of either an internal longitudinal channel or a plurality of external longitudinal slots, the tubular housing positionable into the wellbore adjacent the tubing;
    a plurality of floating optical fibers floatingly positionable in at least one of said channel or slots for measuring at least one first wellsite parameter; and
    a plurality of fixed optical fibers fixedly positionable in at least one of said channel or slots for measuring at least one second wellsite parameter, wherein the plurality of fixed optical fibers measure at least one wellsite parameter using one of Stimulated Brillouin techniques, Fiber Bragg Gratings, distributed acoustic sensing (DAS) measurements and combinations thereof.

6. An integrated fiber optic cable for a wellsite having a tubing positionable in a wellbore extending into a subterranean formation, the fiber optic cable comprising:
    a tubular housing having at least one of either an internal longitudinal channel or a plurality of external longitudinal slots, the tubular housing positionable into the wellbore adjacent the tubing;
    a plurality of floating optical fibers floatingly positionable in at least one of said channel or slots for measuring at least one first wellsite parameter; and
    a plurality of fixed optical fibers fixedly positionable in at least one of said channel or slots for measuring at least one second wellsite parameter, wherein the floating optical fibers are disposed in a gel and the fixed optical fibers are adhered to the housing.

7. The integrated fiber optic cable of claim 6, wherein the first and second wellsite parameters are selected from the group consisting of pressure, temperature, acoustics, curvature, bend, strain and combinations thereof.

8. A fiber optic monitoring system for a wellsite, the fiber optic cable comprising:
    a tubular housing having at least one of either an internal longitudinal channel or a plurality of external longitudinal slots, the tubular housing positionable at the wellsite;
    a plurality of floating optical fibers floatingly positionable in at least one of said channel or slots for measuring at least one first wellsite parameter;

a plurality of fixed optical fibers fixedly positionable in at least one of said channel or slots for measuring at least one second wellsite parameter; and at least one surface interrogation unit operatively couplable to the fiber optic cable for sending optical signals into at least one of said floating and fixed optical fibers and receiving a return signal indicative of a measured wellsite parameter.

9. The integrated fiber optic monitoring system of claim 8, further comprising a plurality of splices for selectively splicing together pairs of the plurality of fixed optical fibers and the plurality of floating optical fibers.

10. A method of monitoring a wellsite, the method comprising:
   a) positioning a fiber optic cable at the wellsite, the fiber optic cable comprising:
      a tubular housing having at least one of either an internal longitudinal channel or a plurality of external longitudinal slots, the tubular housing positionable at the wellsite;
      a plurality of floating optical fibers floatingly positionable in at least one of said channel or slots for measuring at least one first wellsite parameter;
      a plurality of fixed optical fibers fixedly positionable in at least one of said channel or slots for measuring at least one second wellsite parameter;
   b) measuring at least one wellsite parameter by sending optical signals into at least one of said floating and fixed optical fibers and receiving a return signal indicative of a measured wellsite parameter; and
   c) transmitting the measured wellsite parameter to a surface interrogation unit.

11. The method of claim 10, wherein the fiber optic cable includes an optical loop formed by selectively splicing pairs of the plurality of fixed optical fibers and the plurality of floating optical fibers.

12. The method of claim 10, further comprising determining a shape of the cable from the measured wellsite parameter.

13. The method of claim 10, wherein the fixed optical fibers and the floating optical fibers have different sensitivities to different types of acoustic modes and waves, further comprising the step of comparing the measurements taken by fixed optical fibers and the floating optical fibers.

14. The method of claim 10, further including the step of interrogating the fixed optical fibers and the floating optical fibers simultaneously, decoupling the optical signals received as a result of the interrogation, and using the decoupled signals to obtain a seismic profile.

15. The method of claim 10, further including the step of performing distributed acoustic sensing using one of the fixed fibers.

* * * * *